Jan. 6, 1959
C. R. SARE
2,867,289
DUST COLLECTOR
Filed Aug. 16, 1956
3 Sheets-Sheet 1
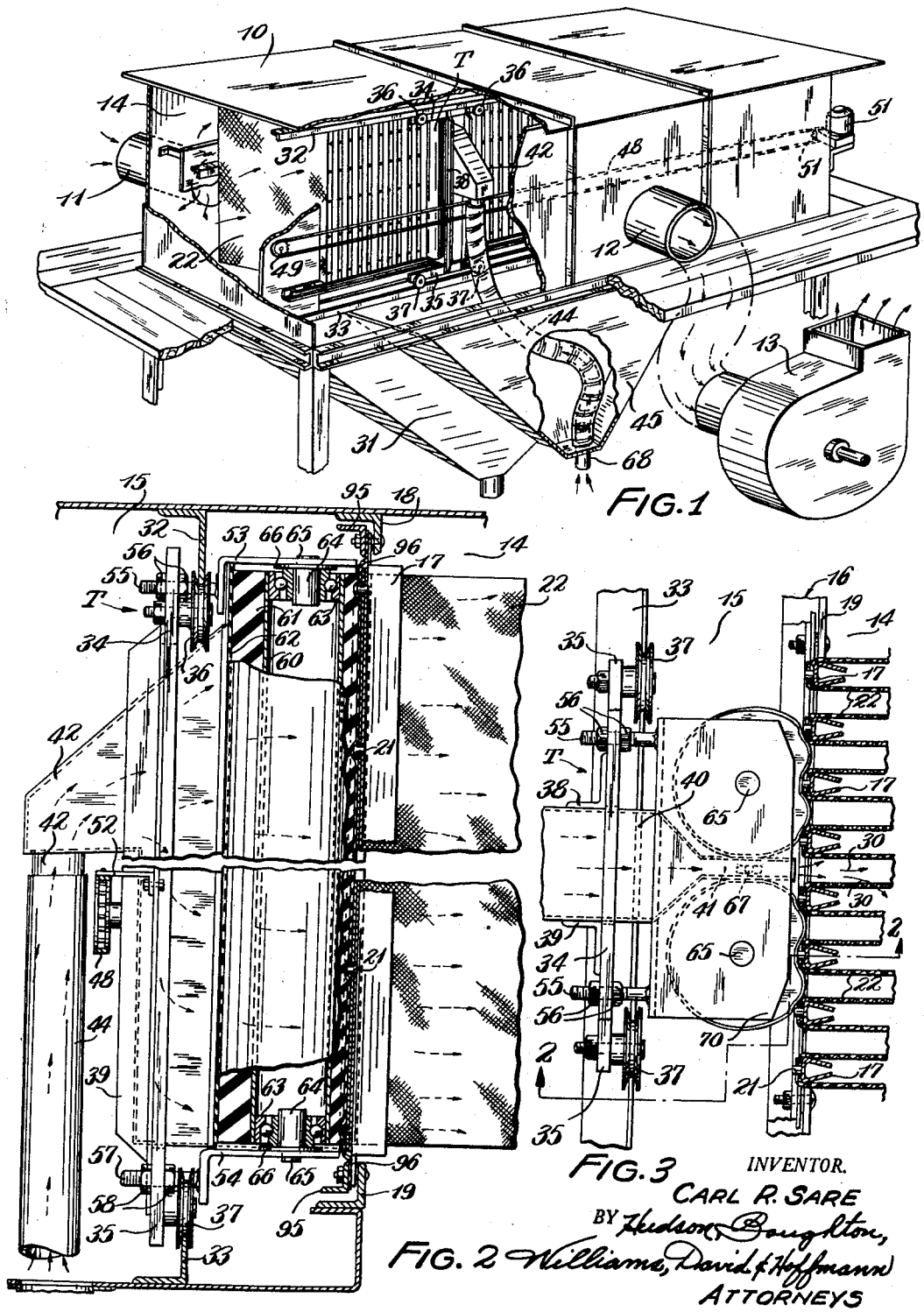
INVENTOR.
CARL R. SARE
BY Hudson Boughton,
Williams, David & Hoffmann
ATTORNEYS

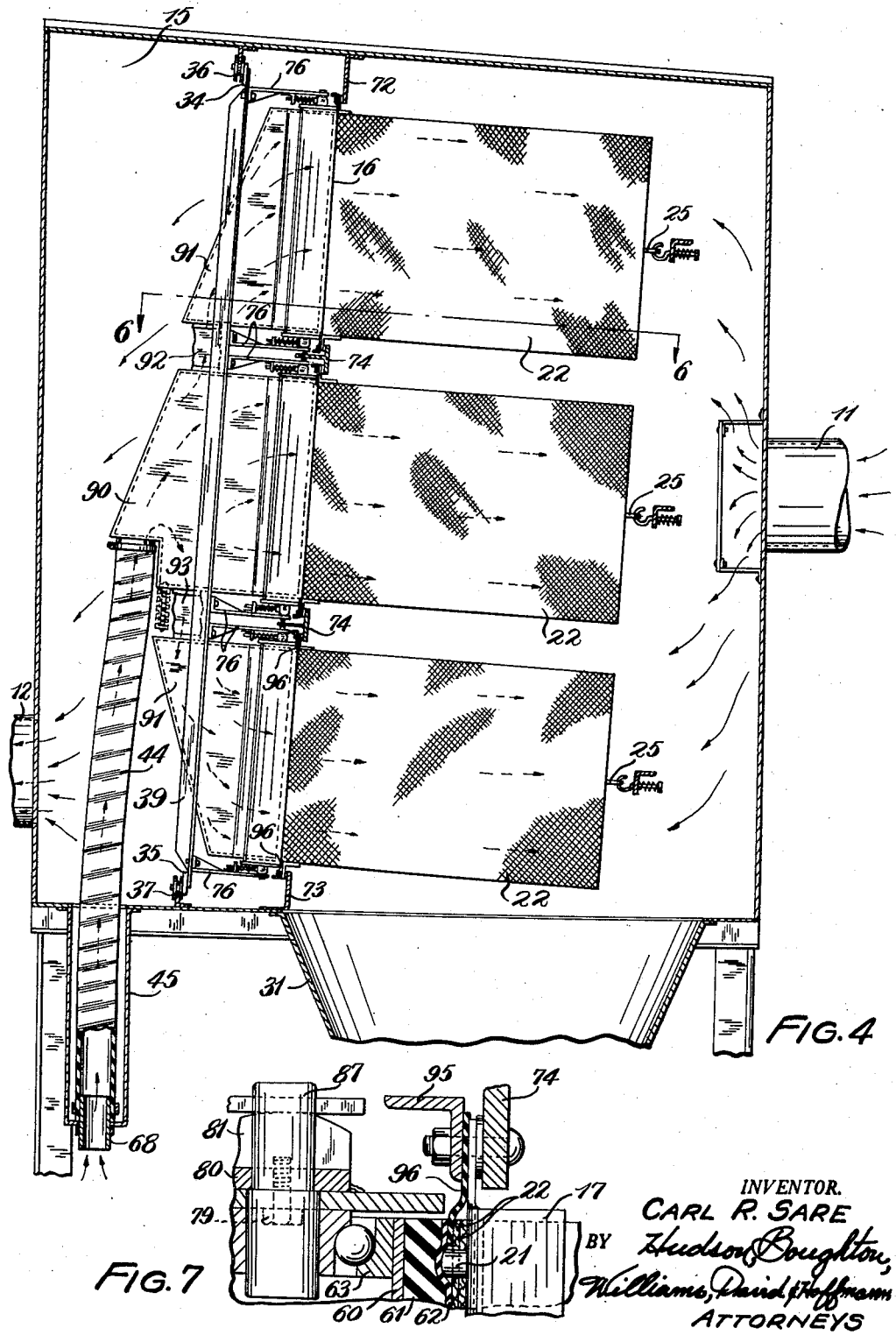

Jan. 6, 1959

C. R. SARE 2,867,289

DUST COLLECTOR

Filed Aug. 16, 1956

INVENTOR.
CARL R. SARE
BY Hudson, Boughton,
Williams, David & Hoffmann
ATTORNEYS

United States Patent Office 2,867,289
Patented Jan. 6, 1959

2,867,289

DUST COLLECTOR

Carl R. Sare, Shaker Heights, Ohio, assignor to The W. W. Sly Manufacturing Company, Cleveland, Ohio, a corporation of Ohio Application August 16, 1956, Serial No. 604,370

19 Claims. (Cl. 183—61)

This invention relates to improvements in dust collectors, more especially dust collectors of the fabric bag type comprising means automatically operative to clean the bags one at a time, that is to dislodge the dust clinging to the outer surface of the bags, the cleaning action being effected by reverse air caused to flow through the bags one at a time in a direction opposite the direction of flow of air in the regular operation of the collector, that is for the removal of dust in the dust-laden air entering the collector.

One of the objects of the invention is the provision of improved means for sealing off the reverse air passage through a traveler passing back and forth in front of the dust wall.

Another object is the provision of sealing means embodying resilient rollers which turn about axes at right angles to the direction of movement of the traveler due to that movement.

Another object is the provision of rollers having cores surrounded by sponge rubber which compresses into tight engagement with the dust wall and any inequalities of the surface of the wall.

Another object is the provision of sealing means which does not have sliding contact with the dust wall and therefore is free of wear to a considerable extent.

Another object of the invention is the provision of a thin rubber skin over the surface of each roller which projects beyond the ends of the sponge rubber portion of the roller and has wiping contact with the end plates in which the rollers are mounted to provide end sealing without wear on the sponge rubber.

Another object is the provision of a mounting for the flexible rollers which provides self-adjustment of the same in relation to the dust wall for compensating for inaccuracies in the wall construction.

Another object is the provision of a dust collector having more than one tier of bags wherein there is a set of rollers for each tier and wherein the rollers for one tier are automatically adjustable independently of those for the remaining tier or tiers.

Still another object is the utilization of fasteners for the forward edges of the bags without any false wall elements to cover the fastenings as would be necessary if the traveler were constituted to slide upon the dust wall, thereby reducing the number of parts and facilitating the replacement of bags when necessary.

Other objects and features of novelty will appear as I proceed with the description of those embodiments of the invention which, for the purposes of the present application, I have illustrated in the accompanying drawings, in which Fig. 1 is a perspective view, partly broken away, of a single tier dust collector embodying the invention.

Fig. 2 is a fragmental vertical view of the same partly in section and on a larger scale.

Fig. 3 is a plan view partly in horizontal section showing the traveler of Figs. 1 and 2.

Fig. 4 is an elevation partly in section of a three-high dust collector embodying the invention.

Fig. 7 is a detailed sectional view on a larger scale of the horizontal sealing strip at the top and bottom of each portion of a multi-high form of the invention.

Figure 5:
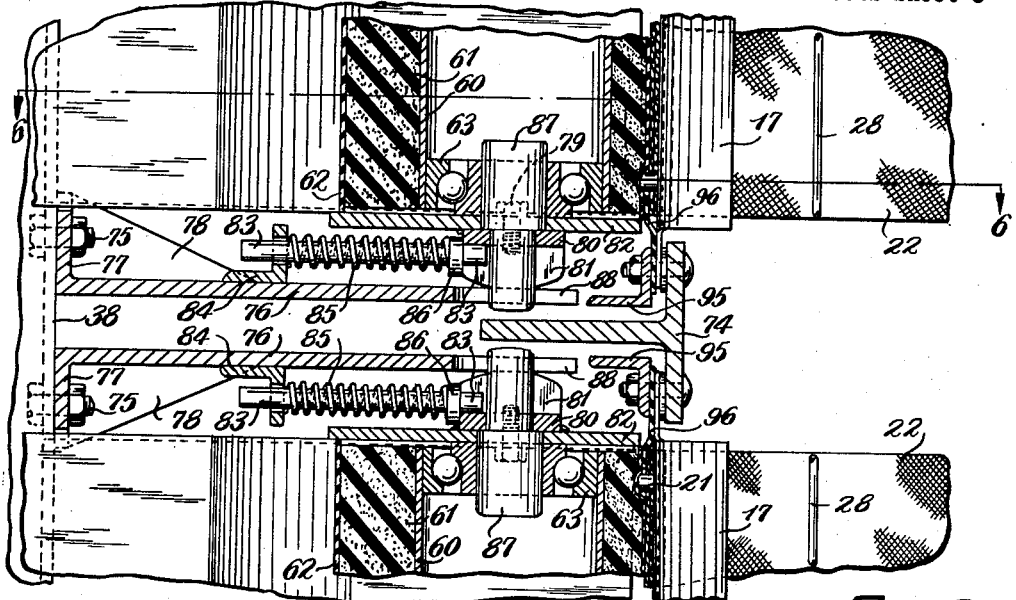
Fig. 5 is a vertical sectional view of a fragment of a multi-tier construction showing the lower end of a roller mounting for one tier and the upper end of a roller mounting for the tier next beneath.

In Fig. 1 the housing of a dust collector is shown at 10. It may be built in sections, the number of which may be varied to suit the volume of air to be treated. Dust-laden air may be admitted through a pipe 11 and clean air discharged through a pipe 12. The flow of air through the machine is induced by a blower 13, the connection of which to the pipe 12 is schematically illustrated in Fig. 1.

The casing is divided into two chambers, the rear one of which is a dust chamber 14 and the front one of which is a clean air chamber 15, the two chambers being separated by a dust wall indicated generally at 16. This wall may be conveniently constituted to include a series of upright mullions 17 mounted at their ends upon horizontal angles 18 and 19. The joints between these angles and the mullions are closed by suitable means such as tar paper strips extending along the wall from one end to the other. The mullions then are held in place by angles 95 and seal is effected by a rubber strip 96 extending the length of the wall. These angles and strips are held in place by bolts 97. In the forward side of each mullion there are rigidly mounted a series of pins 21 spaced vertically a few inches apart. Adjacent mullions are spaced apart a distance to accommodate a screening bag 22 between them. The forward edges of the open ends of each bag are drawn over adjacent mullions and the pins 21 are caused to enter holes in the bags, the forward edge of one bag overlapping the forward edge of an adjacent bag at each mullion, as clearly indicated in Figs. 3 and 6. The pins 21 are necessarily projected somewhat beyond the overlapping bag edges, as otherwise the forward edges of the bags would not be retained in place on the mullions. The pins therefore constitute projections which must be encountered and passed over as the traveler, hereinafter defined, moves over the dust wall.

The bags 22 are supported in the rear by any suitable means. As illustrated herein a mullion 24 may be mounted in the rear end of each bag and may have a hook 25 extending through the rear wall of the bag for attachment to a supporting means, as indicated in Fig. 4.

Figure 6:
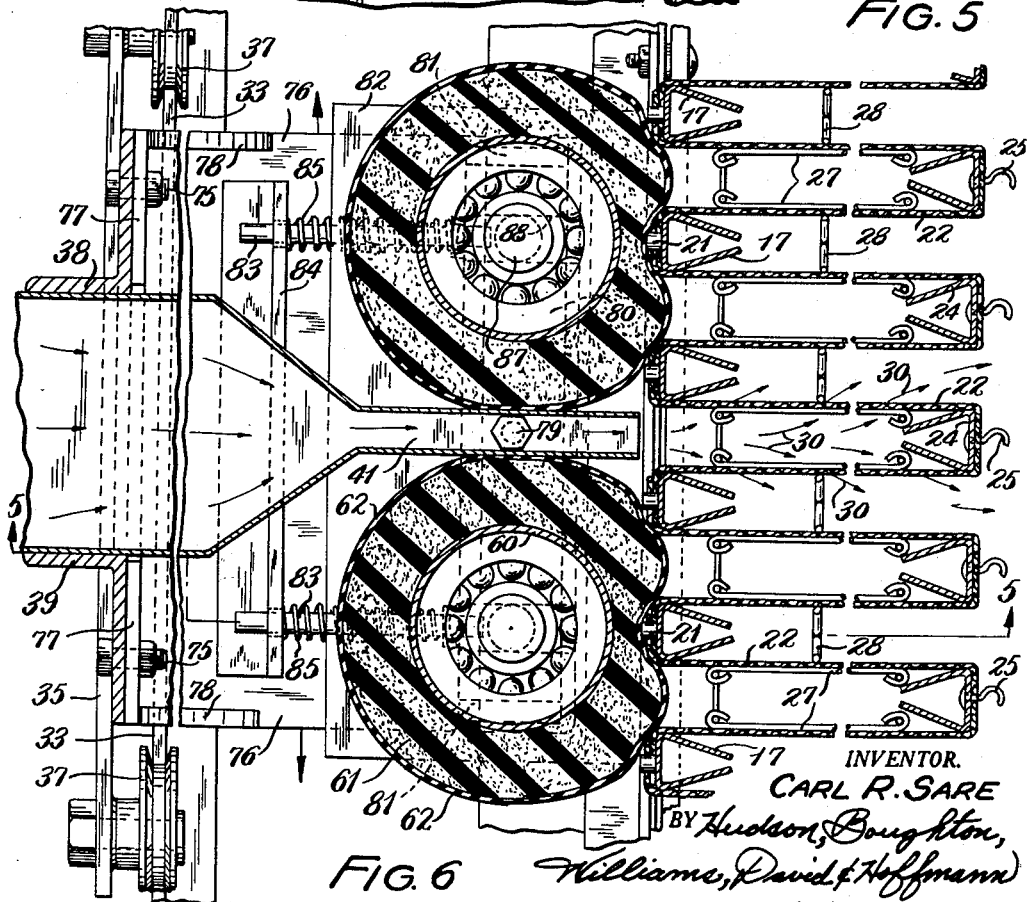
Fig. 6 is a horizontal sectional view taken substantially on the line 6—6 of Fig. 5.

Preferably, each bag may have internal wire spacers shown at 27 in Fig. 6, to keep the bag from collapsing during the ordinary dust collecting operation, and between adjacent bags there are preferably external wire spacers shown partially at 28 in Fig. 6, so that when a bag is being cleaned by the flow of air indicated by arrows 30 in Figs. 3 and 6, the side walls of the bag will not balloon outwardly and permit adjacent bags to touch each other. A more detailed explanation of the internal and external spacers will be found in Patent No. 2,695,681 to G. A. Boesger dated November 30, 1954. The dust dislodged from the exterior walls of the bag being cleaned falls down into a hopper 31 illustrated in Figs. 1 and 4, from which it may be dumped at intervals by the operation of a valve, not shown, but common in the art.

In front of the dust wall 16 in the clean air chamber 15 there are upper and lower tracks 32 and 33 upon which there runs a wheeled traveler generally designated T. This traveler comprises an upper horizontal bar 34 and a lower horizontal bar 35. Each of these bars carries two flanged wheels, the upper ones numbered 36 and the lower ones numbered 37. Between the bars 34 and 35 and welded or otherwise securely fastened to them there are two upright angle irons 38 and 39. The parts 34, 35, 38 and 39 thus constitute a rigid frame carrying flanged wheels which travel back and forth on the tracks 32, 33.

Within this frame there is an air compartment 40 enclosed in sheet metal extending throughout the height of the traveler. At its rear end this compartment is narrowed into a vertical nozzle 41. The compartment 40 and the nozzle 41 are mounted in the rigid frame of the traveler by pins 67 top and bottom extending through slots in plates 53 and 54, hereinafter described, and the nozzle extends rearwardly almost to the dust wall 16. The forward end of compartment 40 merges with a hood 42 from which extends downwardly a cylindrical pipe 43 that is adapted to receive the upper end of a flexible conductor 44. The lower end is connected to a stub pipe 68 which passes through a sealed opening at the bottom of a downwardly tapered portion 45 of the clean air chamber 15, so that the air taken into the conductor is clean air from the atmosphere. The conductor 44 is of sufficient length to permit the traveler to move from one end of the casing 10 to the other.

Conductor 44 communicates preferably with atmosphere so that atmospheric air under atmospheric pressure may be drawn into the hood 42, the compartment 40 and the nozzle 41 by the sub-atmospheric pressure within the dust chamber 14. However, it is within the purview of the invention to supply air under pressure to the lower end of conductor 44, it being necessary merely that the air discharged through the nozzle 41 shall be at a pressure substantially above that in the dust chamber. To accomplish this it is necessary that the nozzle 41 and the bag to be cleaned shall be sealed off from the clean air chamber, that chamber being at a pressure lower than that of the dust chamber and much lower than atmospheric pressure. It is also desirable that at least one bag on either side of the bag being cleaned shall be sealed off from the clean air chamber so that the reverse air passing through the bag being cleaned will not carry dust from that bag onto the outer surface of the next bag. In other words it is desirable that the dust dislodged by the reverse air flow shall fall into the hopper 31 instead of being deposited upon the adjacent bags.

The sealing off of the nozzle, the bag being cleaned and the adjacent bags, is accomplished in this invention by a pair of upright resilient rollers which rotate about their axes as the traveler moves back and forth along the dust wall. The movement of the traveler to cause the rolling of the rollers about their axes may be accomplished by any suitable means, as by an endless chain 48, one link of which is attached to the traveler by a bracket 52, Fig. 2. The chain runs over sprockets 49 and 50 near the ends of the casing and may be driven by a small reversible motor 51, suitable limit switches being provided to reverse the chain travel when the traveler T reaches the end of its movement in either direction, as more particularly set forth in Boesger Patent No. 2,583,039, dated January 22, 1952.

The traveler T of Figs. 1, 2 and 3 comprises a top plate 53 and a bottom plate 54 each of which has a depending flange. The flange of the top plate 53 has a pair of forwardly extending integral studs 55 projecting through smooth holes in the bar 34 and adjustable with respect to that bar by nuts 56 surrounding the studs and bearing against the bar. The bottom plate is similarly mounted upon the bar 35 by studs 57 projecting through smooth holes in bar 35 and adjustably positioned by nuts 58. In the plates 53 and 54 two resilient rollers are rotatably mounted to turn about upright axes on opposite sides of the nozzle 41. Plates 53 and 54 are also slotted to receive top and bottom nozzle pins 67.

As illustrated herein each of these rollers may comprise a rigid hollow core 60 surrounded by a substantial thickness of sponge rubber 61, with an outer covering of sheet rubber 62 or other thin tough flexible sheet material. I have found that a layer of sponge rubber approximately one and one-quarter inches thick and a surface layer of sheet rubber approximately one thirty-second inch thick are suitable for the purpose.

Inside the ends of the core 60 I mount antifriction bearings 63 within which are press fitted bearing pins 64 which have reduced ends 65 that project through holes in the plates 53 and 54, these pins having collars 66 which engage the plates 53 and 54. The reduced ends of the bearing pins 64 are so located in the plates 53 and 54 that when the nuts 56 and 58 are adjusted to cause the resilient rollers to bear against the dust wall substantially as shown in Fig. 3 they will also bear against the side walls of the nozzle 41. The latter contact requires slippage as the rollers roll upon the dust wall, but the walls of the nozzle are smooth and the area of contact is of small width so that relatively little force opposing movement of the traveler is encountered.

In Figs. 4, 5 and 6 a three-high dust collector embodying the invention is illustrated. In all cases, that is, whether the dust collector be a one-high, two-high or three-high collector, the dust wall 16 may be tilted somewhat as illustrated in Fig. 4 and as is conventional practice. The traveler may be correspondingly tilted, but moves back and forth horizontally in a direction at right angles to the length of the traveler. It comprises a rigid frame having top and bottom bars 34 and 35 joined by upright angles 38 and 39 just as in the one-high form of the invention.

In this second form of the invention the dust wall may be divided into two or more sections supported by horizontal bars 72 and 73 at the top and bottom and by horizontal intermediate elements such as T bars 74, the ends of which are firmly anchored in the side walls of the casing.

There may be two or more sets of mullions 17. In the case of a three-high collector there are three sets of mullions 17, the intermediate set being carried between the two T bars 74 and the top and bottom sets between one of the T bars 74 and the top and bottom bars 72 and 73. The bags 22 are mounted between adjacent mullion in each of the three tiers, the mounting for one tier being shown in Fig. 6 as substantially the same as the mounting of the single tier in the one-high form of the invention.

In the three-high form there are three nozzles 41 and three pairs of resilient rollers of the same construction as those of the one-high form. The mounting of the rollers is somewhat different however. Instead of positively adjusting the rollers by manipulating studs 55 and 57 and nuts 56 and 58, and relying upon the resilience of the rollers themselves to cause them to bear correctly on the dust wall, I provide spring means for holding each pair in proper contact with the wall and with the nozzle for that tier. Obviously there is more possibility of deviation from an accurate plane in a three-tier dust wall than in a single tier wall, and on that account the use of the spring mounting is advisable.

As illustrated in Figs. 5 and 6 horizontal plates 76 having right angle flanges 77 and reenforcing triangular webs 78 are secured to the upright angle bars 38 and 39 by bolts 75. These plates extend rearwardly from the traveler toward the dust wall. In the top and bottom end walls of the nozzle 41 for each tier there are pivot pins 79 upon which are mounted steel rocker bars 80 having end flanges 81 with curved edges. Pivots 79 also project through steel plates 82.

Welded to each rocker bar 80 near its ends are spring pilot studs 83 which project forwardly and extend with clearance through holes in an angle bar 84 that is welded to the adjacent plate 76. Springs 85 surrounding studs 83 bear at their ends against bars 84 and against collars 86 on the studs 83.

Bearing pins 87 each having a press fit in a bearing 63, extend through plates 82 and rocker bars 80 and project through slots 88 in plates 76. The resilient rollers therefore may swing to a limited extent about the pivots 79 as the traveler moves back and forth.

In both forms of the invention the rigid core 60 and the sponge rubber 61 terminate short of the plates 53, 54 or the plates 82, and the outer surface layer 62 of gum rubber or the like projects therebeyond to wipe against or bear upon the end plates and constitute end seals.

As illustrated in Fig. 4 the hood portion 90 of the middle air compartment is so shaped as to take the upper end of flexible conductor 44 readily. The hood portions 91 of the top and bottom air compartments are alike but one is reversed with respect to the other. Hood portion 90 is connected with the upper hood portion 91 by a flexible conductor 92 and with the lower hood portion 91 by a similar flexible conductor 93, this arrangement being preferable, although not necessarily essential. Air at atmospheric or higher pressure entering the hood portion 90 through the flexible conductor 44 is divided, part of its passing directly to the middle nozzle 44 and part descending through conductor 93 into the lower hood portion 91, the remainder ascending through conductor 92 into the upper hood portion 91. From the upper and lower hood portions 91 and from the middle hood portion 90 the reverse air passes rearwardly through the bags with which the individual nozzles are in register. A bag in each of the three tiers may be thus connected with reverse air simultaneously, but the apparatus will function properly in case there is some variation in the horizontal placing of the mullions and bags in the three tiers. By the time the air is at the hood its pressure is below atmospheric in all cases except where a reverse air blower is used at the lower end of the flexible conductor 44.

As the traveler T moves back and forth over the dust wall each pair of rollers with their flexible layers 61 and 62 may adjust themselves independently of the other pairs and each pair of top and bottom rocker bars 80 may swing through a small angle if the contours of the dust wall call for such automatic adjustment.

While the construction of the flexible rollers herein described is preferred, it wil be apparent that other constructions enabling the surface of each roller to adjust itself to the dust wall and the side of the adjacent nozzle are within the purview of the invention. For example, an inflatable hollow cylinder could be substituted for the sponge rubber.

The illustrated embodiments of the invention are designed to conduct reverse cleaning air through one bag at a time, and while this is at present preferred the nozzle 41 may obviously be broadened sufficiently to conduct reverse air through more than a single bag at a time the resilient rollers being then separated a distance sufficient to accommodate the wider nozzle.

Having thus described my invention, I claim:

1. In a dust collector, a casing, a dust wall therein dividing the casing into a dust chamber and a clean air chamber, a plurality of porous bags in said dust chamber arranged side by side with their open ends attached to said dust wall normally in communication with said clean air chamber, a traveler movable back and forth over the clean air side of said dust wall, means for conducting reverse air through said traveler and through said wall for cleaning said bags progressively, said traveler comprising a pair of resilient rollers turning on their axes at right angles to the direction of movement of the traveler and disposed on opposite sides of last named means, said reverse air conducting means passing between said rollers and contacting both of them for preventing the reverse air from entering the clean air chamber, said resilient rollers as they travel over the dust wall yielding sufficiently to seal the wall, including any irregularities therein, on both sides of the bag being cleaned and to cause the reverse air to travel through that bag.

2. A dust collector as defined in claim 1, wherein said means for conducting reverse air comprises an elongated nozzle adapted to register with the open ends of the bags to be cleaned, and wherein the mounting of the rollers causes them to effect a seal with said nozzle as well as the face of said dust wall to seal off the bag or bags being cleaned from the clean air chamber in front of the dust wall.

3. A dust collector as defined in claim 2, wherein the said rollers are mounted upon top and bottom plates and the said plates are carried by alinged pivots in the traveler, and wherein pressure-exerting means comprising springs carried by the traveler urge the rollers toward the dust wall, whereby the plates may adjust themselves about their pivots as the traveler moves along the wall to hold the rollers in good contact with a wall the surface of which deviates somewhat from a perfect plane.

4. A dust collector as defined in claim 1, wherein each roller comprises a rigid core surrounded by a resilient body of substantial radial dimensions.

5. A dust collector as defined in claim 1, wherein each roller comprises a rigid core surrounded by a substantial thickness of sponge rubber.

6. A dust collector as defined in claim 1, wherein the traveler comprises top and bottom plates in which the rollers are rotatably mounted, and wherein each roller comprises a resilient body of substantial thickness which terminates short of said plates, and wherein each roller is covered by a relatively thin layer of flexible material which projects beyond the ends of the resilient body into rubbing contact with said plates.

7. In a dust collector, a dust chamber and a clean air chamber, a dust wall between said chambers, said wall comprising vertical mullions, a plurality of porous bags in said dust chamber arranged side by side in a horizontal series with their open ends attached to said mullions in communication with elongated openings between said mullions, means for producing air flow from said dust chamber through said bags into said clean air chamber, a traveler movable back and forth along said wall on the clean air side having means comprising an elongated nozzle for inducing the flow of cleaning reverse air through each bag, said traveler comprising a pair of elongated resilient rollers in the clean air chamber on opposite sides of said nozzle rotatable about their axes and contacting the dust wall opposite at least two mullions on each side of the bag being cleaned, whereby the latter bag is sealed off from the bags on either side thereof.

8. In a dust collector, a dust chamber and a clean air chamber, a dust wall between said chambers, a plurality of porous bags in said dust chamber arranged side by side in a horizontal series with their open ends attached to said wall in communication with elongated vertical openings through the wall, a blower with its intake connected to said clean air chamber for producing a high degree of suction in said clean air chamber and a lower degree of suction in said dust chamber, whereby dust-laden air in said dust chamber flows through said bags into said clean air chamber and out to the discharge side of said blower, a traveler movable back and forth along said dust wall on the clean air side thereof having means comprising an elongated vertical nozzle for inducing the flow of reverse air through each bag, said traveler comprising a pair of elongated vertical resilient rollers in the clean air chamber on opposite sides of said nozzle rotatable about their axes and contacting the nozzle and said wall, whereby the bag or bags being cleaned are sealed off from the bags on either side thereof and from the suction in the clean air chamber.

9. A dust collector as defined in claim 7, wherein the traveler is so positioned relative to the dust wall that each of said resilient rollers is compressed on its forward side as it rolls over the dust wall mullions.

10. A dust collector as defined in claim 7, wherein each of said rollers has a rigid core surrounded by a resilient body of substantial radial dimensions.

11. A dust collector as defined in claim 7, wherein each of said resilient rollers has a rigid core surrounded by sponge rubber.

12. A dust collector as defined in claim 11, wherein the surface of the sponge roller is covered with a thin layer of gum rubber, whereby the sponge rubber is protected from attrition as the traveler rolls over the dust wall.

13. A dust collector as defined in claim 7, said traveler comprising top and bottom plates in which the rollers are rotatably mounted, the ends of said rollers having contact with said plates to cut off communication between said clean air chamber and the bag or bags being cleaned.

14. A dust collector as defined in claim 13, wherein said traveler comprises top and bottom plates in which the rollers are rotatably mounted, and in which the rigid core and resilient body surrounding the core terminate short of said plates but in which the surface layer of gum rubber projects endwise sufficiently to wipe against said plates.

15. In a dust collector, a dust chamber, a clean air chamber, a series of parallelly disposed bags in said dust chamber, a dust wall between said chambers comprising parallel upright mullions, said mullions having projecting pins extending toward the clean air chamber over which the forward open ends of adjacent bags are mounted, a traveler movable across said dust wall on the clean air side thereof, said traveler having an elongated nozzle adapted to register with the open ends of the bag or bags being cleaned, means for creating subatmospheric pressure in the dust chamber, flexible means for conducting cleaning air to said nozzle, said traveler comprising a pair of upright elongated resilient rollers in the clean air chamber on opposite sides of said nozzle rotatable about their axes to close the normally open ends of the bags next adjacent the bag or bags being cleaned, each of said rollers having a surface layer of tough resilient material which rolls over the mullions and the pins carried thereby as the traveler moves across the dust wall, whereby sliding contact between the traveler and dust wall is avoided and wear is accordingly reduced.

16. In a dust collector, a dust chamber, a clean air chamber, a series of parallelly disposed bags in said dust chamber, a dust wall between said chambers comprising parallel upright mullions, a traveler movable across said dust wall on the clean air side thereof, said traveler having an elongated nozzle adapted to register with the open ends of the bags, means for creating sub-atmospheric pressure in the dust chamber, flexible means for conducting clean air from atmosphere to said nozzle, said traveler comprising top and bottom plates, a pair of rollers in said clean air chamber having hard cores surrounded by sponge rubber, stub shafts mounted in said plates extending toward each other, antifriction bearings interposed between the core and aligned stub shafts in the respective plates for rotatably mounting the rollers inwardly of their ends, said rollers being disposed on opposite sides of said nozzle and contacting said nozzle and said wall as the traveler moves back and forth, whereby the bag or bags being cleaned are sealed off from the bags on either side thereof.

17. In a dust collector, a dust chamber and a clean air chamber, a dust wall between said chambers, said wall comprising upright parallel mullions, a plurality of tiers of porous bags in said dust chamber, the bags of each tier being arranged side by side in a horizontal series with their open ends attached to said mullions, each bag being in communication with an elongated opening between adjacent mullions, means for producing air flow from said dust chamber through said bags into said clean air chamber, a traveler movable back and forth along said wall on the clean air side thereof having means comprising a nozzle for each tier of bags for inducing the flow of cleaning reverse air through at least one bag of each tier, said traveler comprising a pair of upright elongated resilient rollers in the clean air chamber disposed at the level of each tier of bags on opposite sides of the corresponding nozzle, said rollers being rotatable about their axes and contacting at least two mullions on each side of the bag being cleaned, and spring means for pressing each pair of rollers independently toward the dust wall whereby the rollers in rolling over the dust wall are caused to compensate for inequalities in the dust wall and to effectively seal off at least one bag on either side of each nozzle.

18. In a dust collector, a dust chamber and a clean air chamber, a dust wall between said chambers, a plurality of porous bags in said dust chamber arranged side by side in a horizontal series with their open ends attached to said wall in communication with elongated vertical openings through the wall, a blower with its intake connected to said clean air chamber for producing a high degree of suction in said clean air chamber and a lower degree of suction in said dust chamber, whereby dust-laden air in said dust chamber flows through said bags into said clean air chamber and out to the discharge side of said blower, a traveler movable back and forth along said dust wall on the clean air side thereof having means comprising an elongated vertical nozzle for inducing the flow of reverse air through each bag, said traveler comprising rotatable resilient means on opposite sides of the nozzle bearing on the dust wall and on the nozzle, placing a barrier between the clean air chamber on the one hand and the nozzle and dust wall on the other, whereby the bag or bags being cleaned are sealed off from the bags on either side thereof and from the suction in the clean air chamber.

19. In a dust collector, a dust chamber, a clean air chamber, a series of parallelly disposed bags in said dust chamber, a dust wall between said chambers having vertical openings therethrough registering with the open ends of said bags, a traveler movable back and forth along said dust wall on the clean air side thereof, said traveler registering progressively with the open ends of the bags to be cleaned, means for producing reverse air flow through said bags progressively as said traveler moves over said dust wall, said traveler comprising a pair of upright, elongated rollers in the clean air chamber rotatable about their axes and so mounted as to bear against the front side of the dust wall on opposite sides of the bag being cleaned, each of said rollers having a resilient and compressible surface, said traveler comprising top and bottom plates, said rollers having hard cores surrounded by resilient rubber, aligned stub shafts mounted in said plates extending toward each other, antifriction bearings interposed between said core and each of said aligned stub shafts in the respective plates for rotatably mounting the rollers inwardly of their ends, the resilient portions of the rollers bearing at their ends against said plates.

References Cited in the file of this patent

UNITED STATES PATENTS

| | | |
|---|---|---|
| 360,130 | Whitehill | Mar. 29, 1887 |
| 407,948 | Case | July 30, 1889 |
| 996,860 | Kestner | July 4, 1911 |
| 2,507,335 | Donohue | May 9, 1950 |
| 2,583,039 | Boesger | Jan. 22, 1952 |
| 2,685,548 | Drozdowski | Aug. 3, 1954 |
| 2,695,681 | Boesger | Nov. 30, 1954 |